US008566879B2

(12) United States Patent
Nishikawa et al.

(10) Patent No.: US 8,566,879 B2
(45) Date of Patent: Oct. 22, 2013

(54) METHOD AND APPARATUS FOR NAVIGATING VIDEO CONTENT

(75) Inventors: Yuko Nishikawa, La Jolla, CA (US);
Michael A. Bergeron, Poway, CA (US);
Himgan Wibisono, San Francisco, CA (US); Philip McKay, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 758 days.

(21) Appl. No.: 11/081,217

(22) Filed: Mar. 15, 2005

(65) Prior Publication Data
US 2006/0080716 A1 Apr. 13, 2006

Related U.S. Application Data

(60) Provisional application No. 60/614,064, filed on Sep. 28, 2004.

(51) Int. Cl.
*H04N 5/445* (2011.01)
*H04N 7/10* (2006.01)

(52) U.S. Cl.
USPC .............................................. 725/52; 725/43

(58) Field of Classification Search
USPC .................... 386/95; 725/38, 43, 52
See application file for complete search history.

(56) References Cited

U.S. PATENT DOCUMENTS

| | | | |
|---|---|---|---|
| 5,371,551 A | 12/1994 | Logan et al. | |
| 6,005,562 A * | 12/1999 | Shiga et al. | 715/721 |
| 6,177,938 B1 * | 1/2001 | Gould | 715/784 |
| 6,233,389 B1 | 5/2001 | Barton et al. | |
| 6,360,057 B1 * | 3/2002 | Tsumagari et al. | 386/95 |
| 6,822,661 B2 | 11/2004 | Sai et al. | |
| 6,847,778 B1 * | 1/2005 | Vallone et al. | 386/344 |
| 7,047,201 B2 * | 5/2006 | Chang | 704/503 |
| 7,665,031 B2 * | 2/2010 | Matthews et al. | 715/779 |
| 7,716,701 B2 * | 5/2010 | Son et al. | 725/39 |
| 8,032,010 B2 * | 10/2011 | Kim et al. | 386/314 |
| 2002/0092021 A1 * | 7/2002 | Yap et al. | 725/55 |
| 2002/0163532 A1 * | 11/2002 | Thomas et al. | 345/723 |
| 2003/0122966 A1 * | 7/2003 | Markman et al. | 348/563 |
| 2003/0184598 A1 * | 10/2003 | Graham | 345/838 |
| 2006/0020966 A1 * | 1/2006 | Poslinski | 725/37 |

* cited by examiner

*Primary Examiner* — Dominic D. Saltarelli
*Assistant Examiner* — Sumaiya A Chowdhury
(74) *Attorney, Agent, or Firm* — Fitch, Even, Tabin & Flannery LLP

(57) ABSTRACT

Methods and apparatus for navigating video content. Digital markers may be placed at desired locations within recorded or cached video content. In one embodiment, these markers (or bookmarks) may be used to instantly jump to a particular scene or location within a video presentation. Such markers may be manually or automatically placed during live caching of video content or playback of previously recorded content. In another embodiment, selectable thumbnailed images that are representative of the video content at previously bookmarked locations may be presented to a user. Such selectable thumbnailed images may be integrated with a DVR status bar and, when selected, may be used to begin viewing stored video content from the bookmark corresponding to which ever thumbnail is chosen.

17 Claims, 8 Drawing Sheets

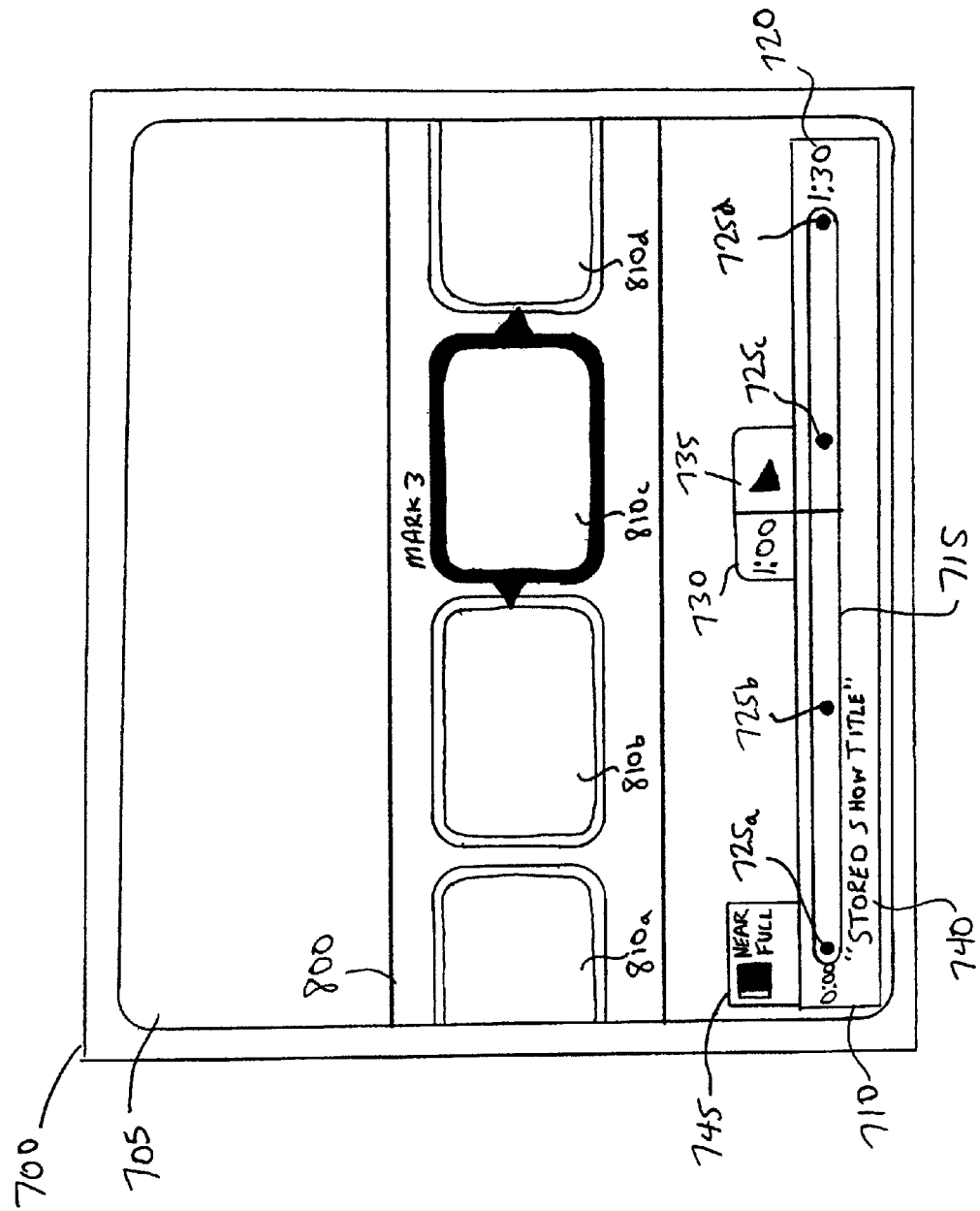

METHOD AND APPARATUS FOR NAVIGATING VIDEO CONTENT

CROSS REFERENCE TO RELATED APPLICATION

This application claims priority to U.S. Provisional Patent Application Ser. No. 60/614,064 filed on Sep. 28, 2004.

FIELD OF THE INVENTION

This invention relates generally to navigating video content, and in particular to navigating bookmarked video content using thumbnailed images thereof.

BACKGROUND OF THE INVENTION

The Video Cassette Recorder (VCR) has changed the lives of television (TV) viewers by allowing viewers to time-shift TV programs to match their lifestyles. Using the VCR, the viewer stores programs onto magnetic tape; this can then be played back at the viewer's convenience. The VCR gives the viewer the ability to pause the program playback whenever he desires, fast-forward through unwanted program material or commercials, and to replay favorite scenes. However, a VCR cannot both capture and play back information at the same time.

The use of a digital computer system to solve this problem has been suggested. U.S. Pat. No. 5,371,551 issued to Logan et al., on Dec. 6, 1994, teaches a method for concurrent video recording and playback. It presents a microprocessor-controlled broadcast and playback device. However, the approach requires that the microprocessor and hard disk must be very fast in order to keep up with high video rates found in television transmission.

The use of a multimedia time-warping system to solve this problem has been suggested. U.S. Pat. No. 6,233,389 issued to Barton et al. on May 15, 2001 teaches such a system, which utilizes the approach that decouples the microprocessor from the high video data rates, thereby reducing the microprocessor and system requirements, which are at a premium. The common name employed in the art to describe such a multimedia time-warping system is Digital Video Recorder (DVR). DVR systems typically provide the ability to navigate through content which has been stored or cached. Such navigation may include, for example, fast forwarding or reversing through a stored program.

Heretofore, in order to find a particular scene of a recorded program using a DVR-type device, a user would have to manually navigate through the entire presentation using fast forward, rewind, etc. However, this can be both tedious and time consuming. Thus, what is needed is an improved method and apparatus for navigating to particular scenes or portions of recorded or cached video content.

SUMMARY OF THE INVENTION

Methods and apparatus for navigating video content. In one embodiment, a method includes receiving a request to insert a digital mark at a desired viewing location within stored broadcast video content, and inserting the digital mark at the desired viewing location. The method further includes receiving a request to view the stored broadcast video content beginning from the desired viewing location, and displaying, in response to the request to view, the stored broadcast video content beginning from the desired viewing location.

Other aspects, features, and techniques of the invention will be apparent to one skilled in the relevant art in view of the following detailed description.

BRIEF DESCRIPTION OF THE DRAWINGS

FIG. 8 depicts still another embodiment of a status bar along with a thumbnail view in a manner consistent with the principles of the invention.

DETAILED DESCRIPTION OF THE EXEMPLARY EMBODIMENTS

One aspect of the invention is to enable users to place markers at desired locations within recorded or cached video content. In one embodiment, such markers may be placed while the content is being recorded or cached, while in another embodiment the markers may be placed after the content has been recorded or cached. Such markers (which may also be referred to herein as bookmarks or chapter marks) may be used to instantly jump to a particular scene or location within a video presentation. In one embodiment, the invention relates to a Digital Video Recorder (DVR) system attached to a display device. To that end, the invention may be housed in a set-top box which provides a video signal to a display device for presentation of video content. In addition, the set-top box device may be integrated into a DVR system, or may be coupled to a separate DVR system.

In one embodiment, bookmarks may be manually placed during live caching of video content, playback of previously recorded content, or active recording of content. In another embodiment, one or more automatic bookmarks may be inserted at, for example, the beginning of live cache, the end of live cache, the beginning of a recorded program and the end of a recorded program.

Another aspect of the invention is to present a user with selectable thumbnailed images representative of the video content at one or more bookmarked locations. This may be advantageous since a user will be able to decide, prior to jumping to the location, whether or not the image being shown corresponds to the desired content. In one embodiment, the selectable thumbnailed images may be integrated with a DVR status bar. In another embodiment, a thumbnailed image may be generated for each bookmark, whether automatic or manual. A user may then scroll through the thumbnails, and hence the bookmarks, and select to begin viewing the content from which ever thumbnail is then chosen.

Figure 1:
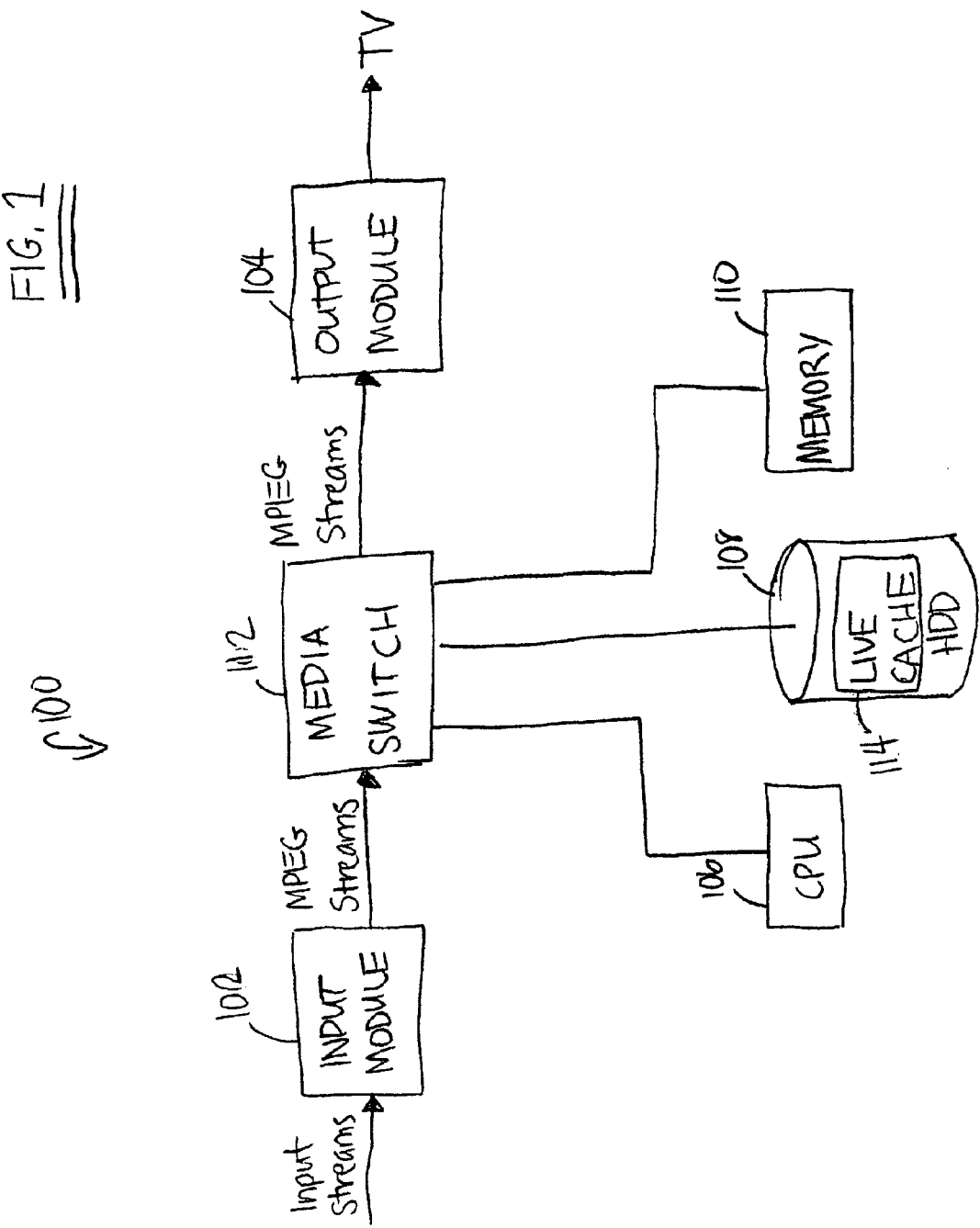
FIG. 1 depicts an embodiment of a system capable of implementing one or more aspects of the invention.

Referring now to the drawings, FIG. 1 illustrates an embodiment of a DVR system 100 capable of implementing one or more aspects of the invention. In the embodiment of FIG. 1, the system 100 includes an input module 102, a media switch 112, and an output module 104. In one embodiment, the input module 102 may accept video input streams in a multitude of forms (e.g., National Television Standards Committee (NTSC), PAL, Digital Satellite System (DSS), Digital Broadcast System (DBS), Advanced Television Standards Committee (ATSC), etc.). DBS, DSS, and ATSC are based on standards called Moving Pictures Experts Group 2 (MPEG2) and MPEG2 Transport. MPEG2 Transport is a standard for formatting the digital data stream from the source transmitter so that a receiver can disassemble the input stream to find programs in the multiplexed signal.

The input module 102 may produce MPEG streams. An MPEG2 transport multiplex supports multiple programs in the same broadcast channel, with multiple video and audio feeds and private data. The input module 102 may also be used to tune the channel to a particular program, extract a specific MPEG program out of it, and feed it into the rest of the system. Analog video signals may be encoded into a similar MPEG format using separate video and audio encoders, such that the remainder of the system is unaware of how the signal was obtained. Information may be modulated into the Vertical Blanking Interval (VBI) of the analog video signal in a number of standard ways. For example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals may be decoded by the input module 102 and passed to the other modules as if they were delivered via a MPEG2 private data channel.

In one embodiment, the media switch 112 mediates between a microprocessor CPU 106, hard disk or other storage device 108, which may or may not include the DVR system's live cache 114, and volatile memory 110. Input streams are converted to an MPEG stream and sent to the media switch 112. The media switch 112 buffers the MPEG stream into memory. If the user is watching real time broadcast content, the media switch 112 may send the stream to the output module 104, as well as simultaneously write it to the hard disk or storage device 108.

The output module 104 may take the MPEG streams as input and produces an analog video signal according to a particular standard (e.g., NTSC, PAL, or other video standard). In one embodiment, the output module 104 contains an MPEG decoder, on-screen display (OSD) generator, analog video encoder and audio logic. The OSD generator may be used to supply images which will be overlaid on top of the resulting analog video signal. Additionally, the output module 104 can modulate information supplied by the program logic onto the VBI of the output signal in a number of standard formats, including NABTS, CC, and EDS.

Memory 110 may further contain instructions to cause CPU 106 to insert programming information directly into the MPEG data stream(s). The user may input control instructions for displaying such programming information via a remote control device button, for example. It should equally be appreciated that a user may provide instructions to the DVR system 100 using any other known user input means. Memory 110 may also include instructions for causing CPU 106 to place, in response to a user instruction, one or more chapter marks at various viewing locations of cached or recorded content. Memory 110 may also instructions for generating one or more thumbnailed images representative of the content at the previously-placed chapter marks. Memory 110 may further include instructions for causing the CPU 106 to perform various other DVR-related operations, some of which will be described in more detail below.

Figure 2:
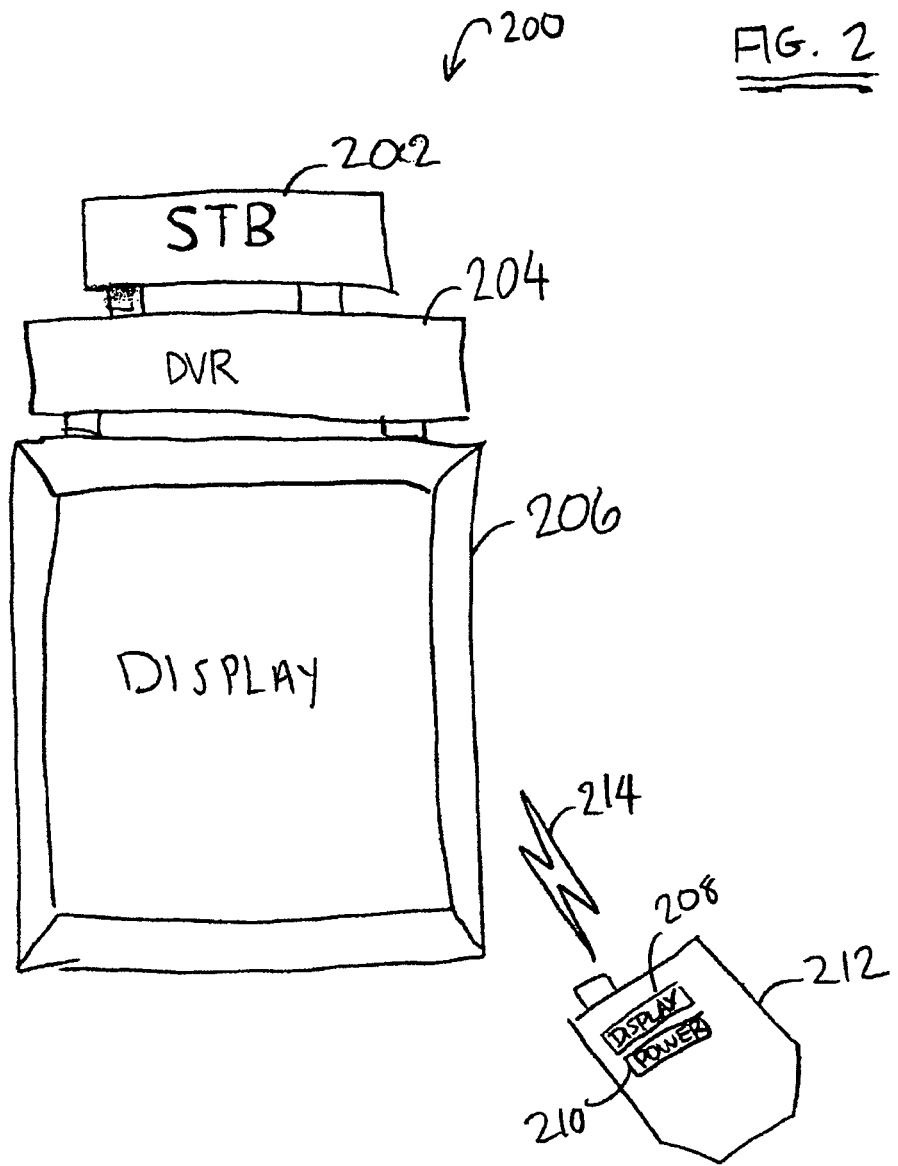
FIG. 2 depicts another embodiment of a system capable of implementing one or more aspects of the invention.

With respect to FIG. 2, which depicts one embodiment of a system 200 which implements one or more aspects of the invention as a set-top box (STB) 202 which is separate from a DVR-type device. In this embodiment, the STB 202 is in communication with a DVR 204. The ensemble of the STB 202 and the DVR 204 collectively may be coupled to a display device, such as display 206. In one embodiment, the user may interact with the STB 202 by means of control instructions sent by pressing buttons on the wireless remote 212. The user may press the display button 208 to input a control instruction 214 to the STB 202 to begin displaying information in a status bar at the bottom of the screen of the TV set 206, about the programming being displayed on display device 206. In another embodiment, the remote control 212 may include a power key 210 to power the STB 204 on or off. It should equally be appreciated that a user may provide instructions to the STB 202 using any other known user input means. Moreover, wireless remote 212 may have additional or fewer input options than those depicted.

Figure 3:
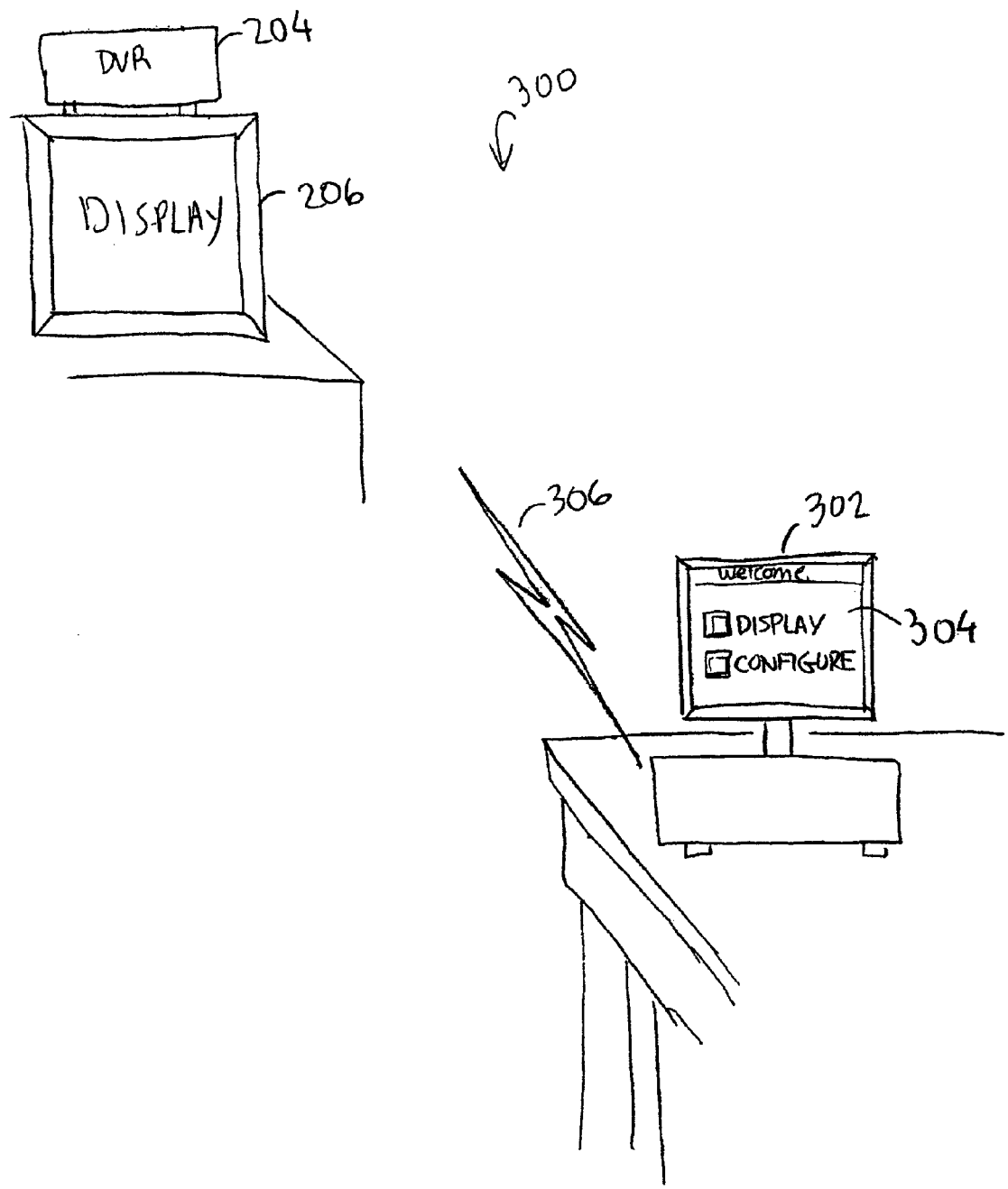
FIG. 3 depicts yet another embodiment of a system capable of implementing one or more aspects of the invention.

FIG. 3 depicts another embodiment of a system 300 capable of implementing one or more aspects of the invention. In this system 300, a dedicated device 302 with a touch-screen 304 with display and configure options. Upon selection of the appropriate option by touching the screen 304, a control instruction 306 may be sent to the DVR 204 residing, e.g., atop the display 206 to carry out the functions described above.

Figure 4:
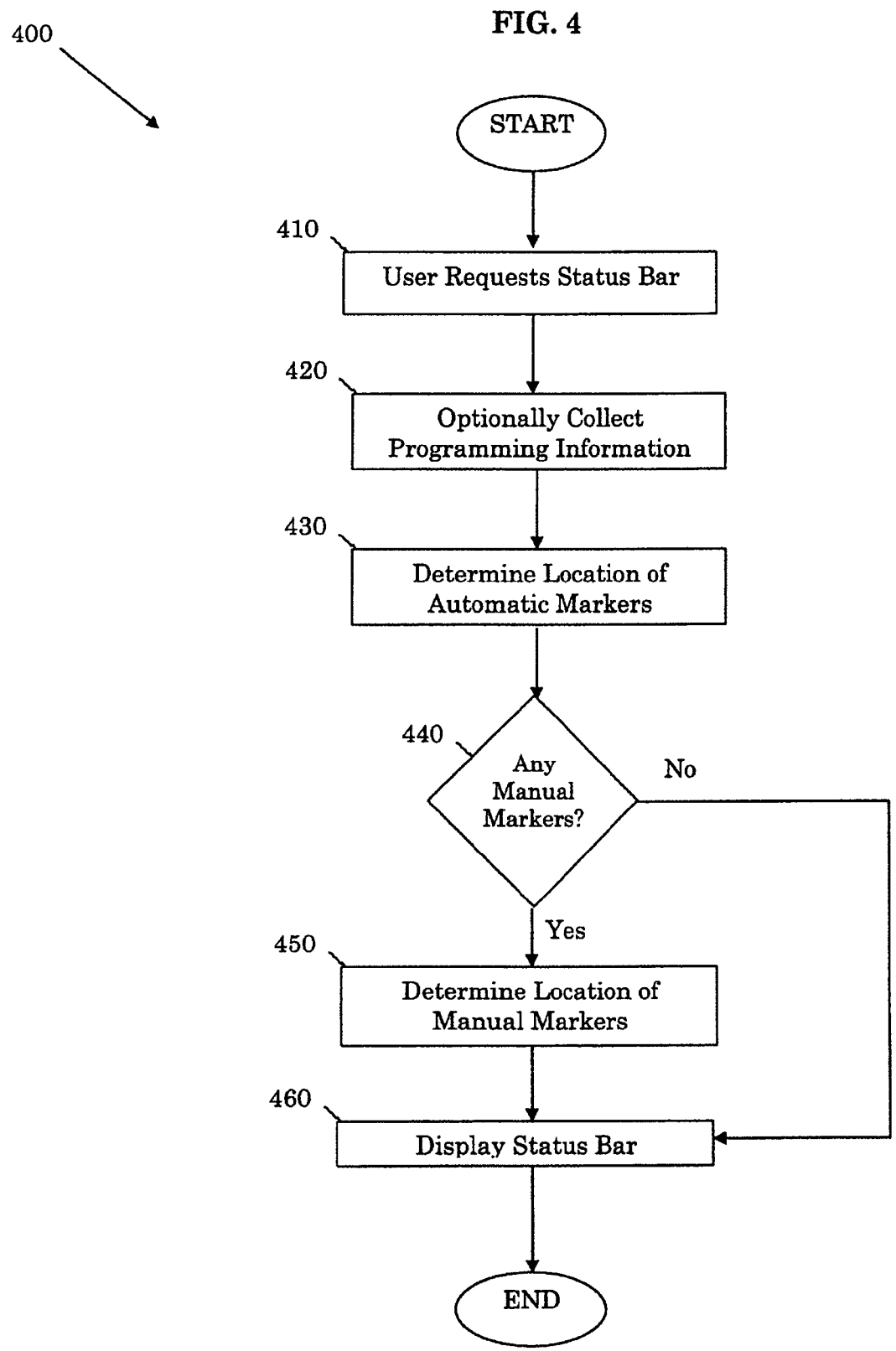
FIG. 4 depicts a flow diagram illustrating one embodiment of a process for carrying out one or more aspects of the invention.

FIG. 4 depicts one embodiment of a process 400 for implementing one or more aspects of the invention. When process 400 begins, the process starts with block 410 where a user may input a control instruction to display a DVR status bar. In one embodiment, the DVR status bar may be displayed i) when any of the DVR-related remote control keys is pressed, at the beginning of playback, at the end of playback, and/or when a new chapter is placed by the user.

In response to the control instruction to display the DVR status bar, process 400 continues to block 420 where programming information (e.g., actors' names, show name, time/date, etc.) may optionally be collected. In one embodiment, programming information may be retrieved from the electronic programming guide. The programming information may relate to video content that has been stored on a DVR-type system and/or video content to be live cached. Live cache refers to a temporary area of storage where live programming may be temporarily placed so that the cached program can be viewed again during the user's current viewing session. In one embodiment, the live cache is a fixed size, with a default time of 30 minutes and user configurable up to 90 minutes. Moreover, more than one program can be stored in live cache, up to the limit of the cache size.

Whether or not programming information is collected at block 420, process 400 then continues to block 430, wherein the locations of any automatic markers may be determined. As previously mentioned, automatic markers may be inserted by, DVR system 100, at one or more of the beginning of live cache, the end of live cache, the beginning of a recorded program and the end of a recorded program. As previously mentioned, one aspect of the invention is to enable the placement of bookmarks or digital markers at various locations within a recorded or cached video presentation, as well as during the actual recording/caching process. Such digital markers may then be used to quickly jump to a particular location within a recorded or cached program.

Once any of the automatic markers are located, process 400 may then continue to decision block 440 where a determination may be made as to whether there have been any manual markers placed by the user. If so, then at block 450 process 500 must also identify the location of any such manual digital markers as well. In one embodiment, the process of determining the location of any automatic or manual markers involves scanning the recorded or cached content for the occurrence of one or more digitally inserted markers. Such digital markers may be a small string of identifiable program code inserted into the actual recorded video content file. In another embodiment, a meta-data file (e.g., text file) which contains the marker information may be stored separate from the video content itself. It should be appreciated that other known methods of inserting digital bookmarks or markers may similarly be used.

Once all of the markers have been located, process 400 may then continue to block 460 where the status bar, along with the identified bookmarks, may then be presented on-screen to the user. Although in one embodiment the status bar is displayed as an overlay onto the video content being viewed, numerous other configurations may similarly be used for presenting the status bar to the user. Two embodiments of such a status bar are shown with reference to FIGS. 6 and 7 below.

Figure 5:
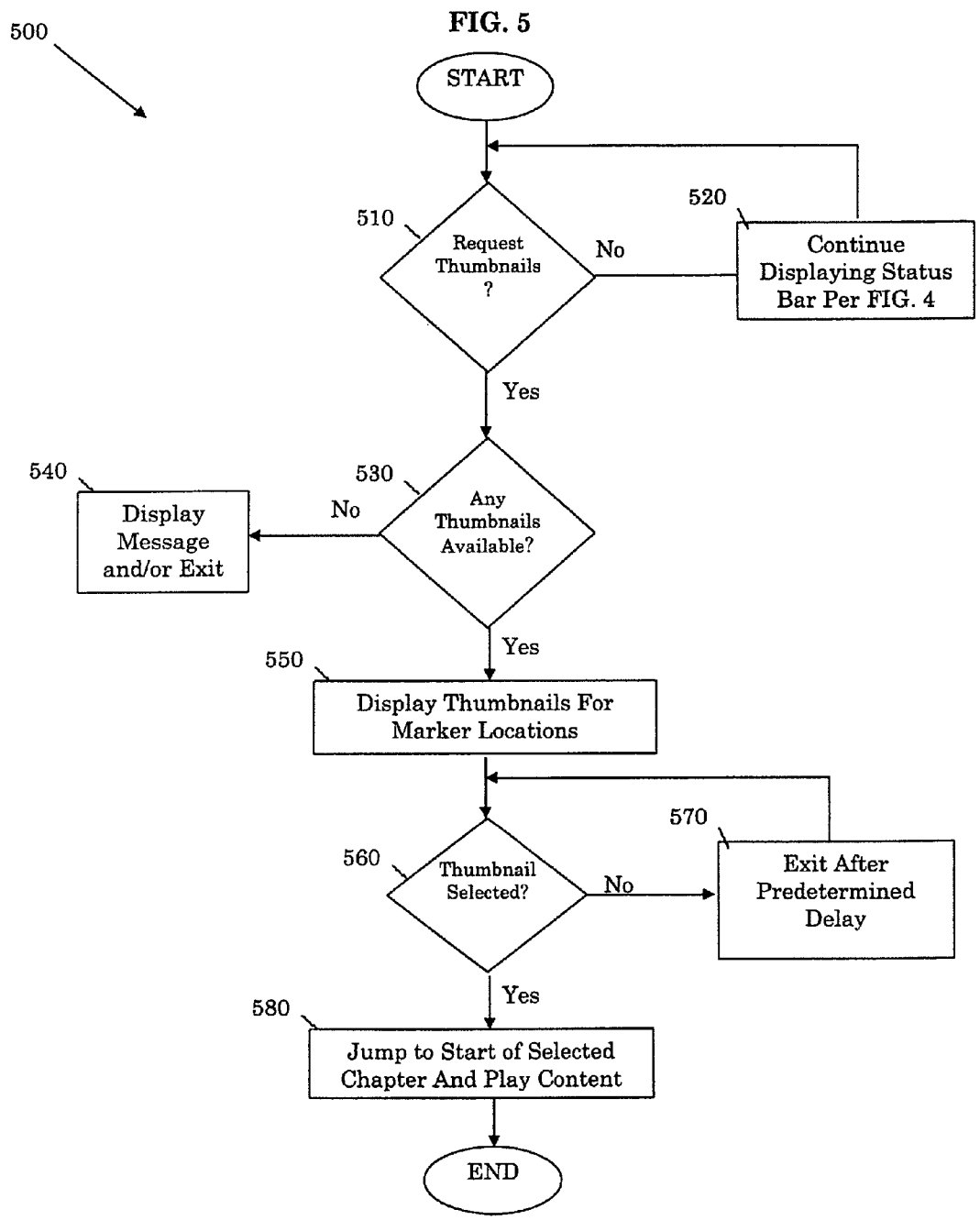
FIG. 5 depicts a flow diagram illustrating one embodiment of a process for carrying out one or more aspects of the invention.

Referring now to FIG. 5, depicted is one embodiment of a process 500 for displaying one or more thumbnailed images which correspond to the bookmarks of FIG. 4. At block 510, once the status bar is displayed, a user may request to view any available thumbnailed images (e.g., by pressing 'up' on a remote control device). If no such request is made, then the status bar will continue to be displayed in the normal course (block 520). If, on the other hand, a user does request to view any available thumbnailed images then process 500 will continue to block 530. At block 530, the process 500 determines if there are any thumbnails to view. If not, then a message to that effect may be displayed to the user at block 540. If there are one or more thumbnails to view, however, then process 500 may then continue to block 550.

At block 550, any available thumbnailed images found at block 530 will be displayed. In one embodiment, the thumbnailed images may be displayed in a sequence organized from left to right, with the left-most thumbnail corresponding to the first bookmark in the given program and the right-most thumbnail corresponding to the last bookmark in the program. In one embodiment, the thumbnail may be a representative image captured from a location within a previously or presently recorded or cached program which corresponds to either an automatic or a manual digital marker. One embodiment of how the appearance of the thumbnailed images is described in more detail below with reference to FIG. 8.

Once the available thumbnailed images are displayed, process 500 may then continue to block 560 where a user may decide to select one of the thumbnails. If no user selection is detected, the thumbnailed images will cease to be displayed and the process 500 will be exited after a predetermined delay (e.g., 30 seconds) at block 570. If, on the other hand, a user selection is detected at block 560, then process 500 will move to block 580 where the current viewing location will jump to the selected bookmark and the video content will begin playing from that point.

Figure 6:
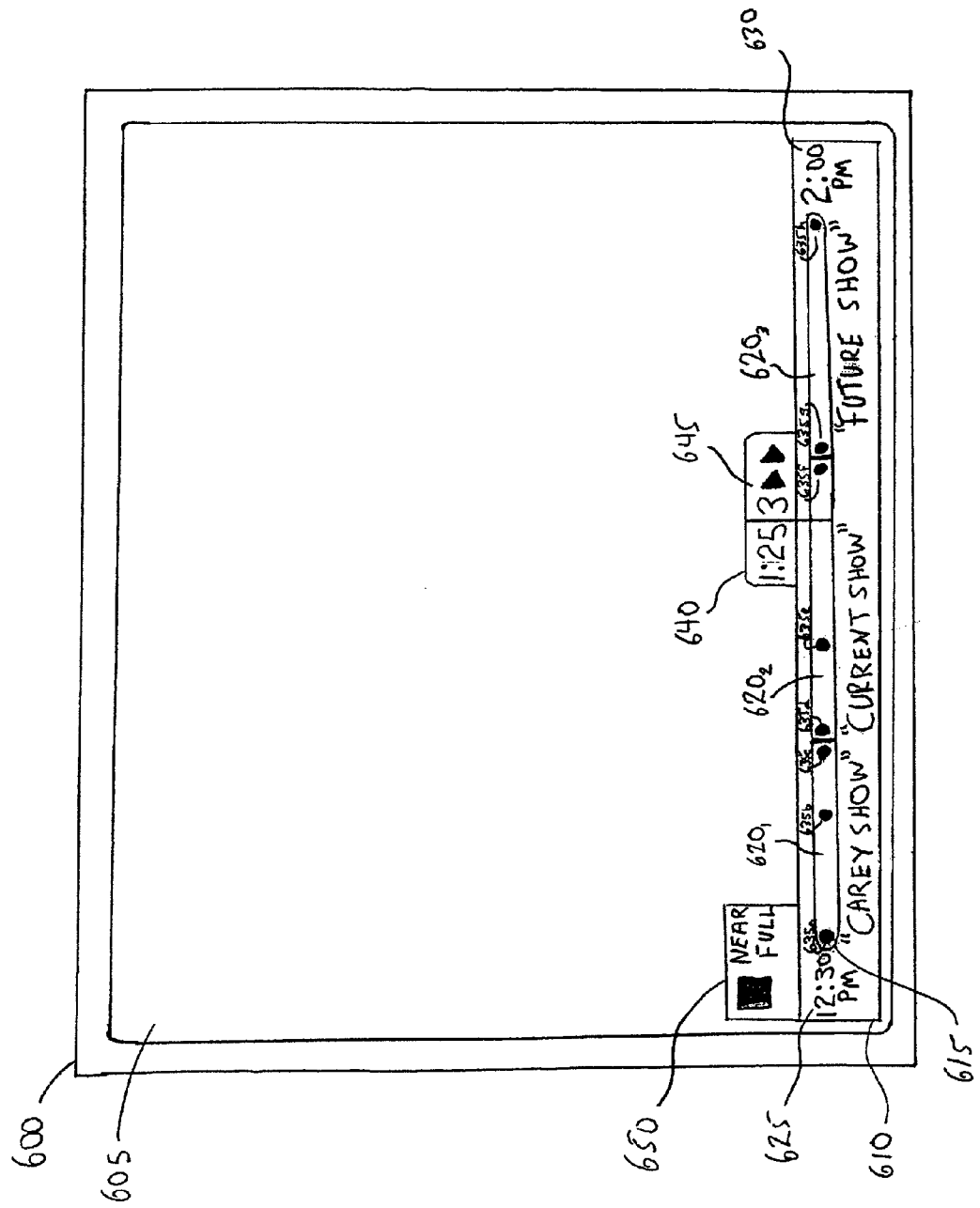
FIG. 6 depicts one embodiment of a status bar displayed in accordance with the principles of the invention.

Referring now to FIG. 6, depicted is one embodiment of a screen 605 containing video content (not shown) that is being displayed on a display device 600. In this embodiment, status bar 610 is being overlaid on the screen 605 of the video content, which may be comprised of stored, cached or live video content.

Status bar includes a progress bar 615 which is a graphical representation of the cached video content. In one embodiment, the progress bar 615 may be divided into one or more segments $620_1$-$620_3$, where each segment denotes a individual cached program. It should further be appreciated that the program cache may be of a fixed size (e.g., 30 minutes) and/or may be user configurable. In the embodiment of FIG. 6, the live cache is a 90 minute cache and may contain any number of programs up to the limit of the cache size.

Continuing to refer to FIG. 6, the status bar 610 is displayed near the bottom of the screen 605 further indicates the beginning of live cache in hours and minutes, as denoted by cache start time 625. Similarly, the end of the last segment (i.e., segment $620_3$) is denoted by cache end time 630.

As shown in FIG. 6 and as previously described with reference to FIG. 4, chapter marks $635_a$-$635_h$ may be used to denote the beginning and ending of each segment/program. For example, each segment $620_1$-$620_3$, is shown as including a beginning mark and an end mark. In addition, a user may be provided with the ability to place chapter marks (i.e., marks $635_b$ and $635_e$) in live cache or in the recorded contents at points other than segment transitions. As previously mentioned, such chapter marks (or bookmarks) may be used to quickly jump to a particular point in the live cache by, for example, by pressing a "Next" or "Previous" button on a user input device.

Status bar 610 is also depicted with optional play status box 640. In one embodiment, play status box 640 may be used to show the current position in the live cache. In this embodiment, the user is currently viewing video content from the second segment $620_2$ at the 1 hour and 25 minute point. In addition, the play status box may optionally indicate the current trick play status 645. In this embodiment, the user is fast forwarding through live cache at 3 times the normal pace. Numerous other icons may be used to denote the following trick play conditions: Play, FF, REW, Slow, Slow Reverse, Stop, Pause, Advance, Previous and Next, Frame-by-Frame Forward and Reverse.

Status bar 610 is further depicted as including program title information below the progress bar 615 for the various programs stored in cache. In particular, the first cached program is cached in segment $620_1$ (i.e., "Carey Show"), the second cached program is cached in segment $620_2$ (i.e., "Current Show"), while the last cached program is cached in segment $620_3$ (i.e., "Future Show"). Moreover, the status bar 610 of FIG. 6 may further include an optional storage status box which indicates the current amount of storage available.

Figure 7:
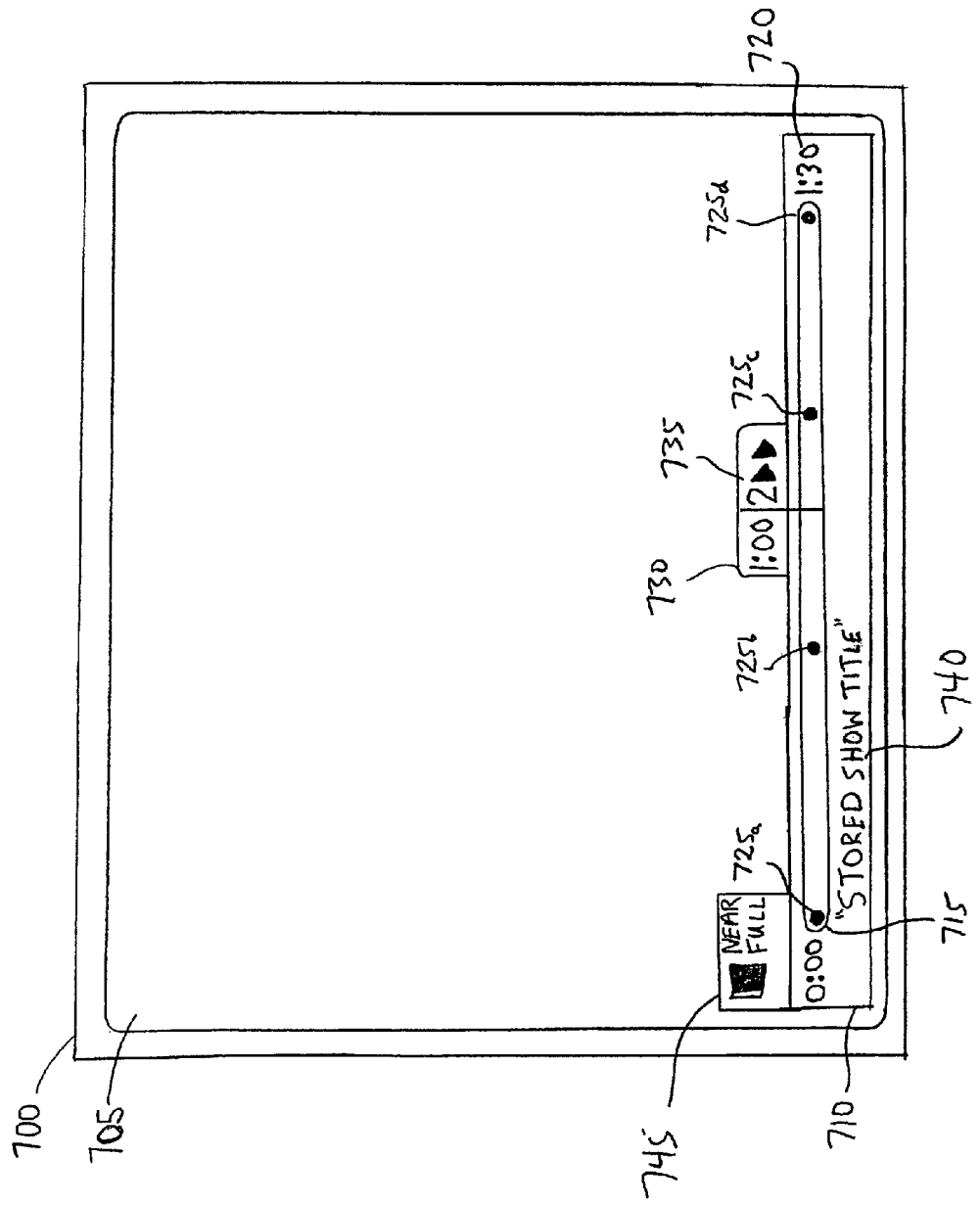
FIG. 7 depicts another embodiment of a status bar displayed in accordance with the principles of the invention.

Referring now to FIG. 7, depicted is one embodiment of a screen 705 containing video content (not shown) that is being displayed on a display device 700. In this embodiment, the status bar 710 is being overlaid on the screen 705 of the video content, which is comprised of stored video content.

The status bar 710 includes a progress bar 715 which is a graphical representation of the stored video content (e.g., a broadcasted program). The status bar 710 is displayed near the bottom of the screen 705 further indicates the beginning of the stored video content as 0:00. The end of the stored video content is denoted by end time 720.

As shown in FIG. 7, chapter marks $725_a$-$725_d$ may be used to denote the beginning and ending of the video content, as well as any user-placed chapter marks. As previously mentioned, chapter marks may be used to quickly take a viewer to a particular point in a program. Status bar 710 is also depicted with optional play status box 730. In one embodiment, play status box 730 may be used to show the current viewing position in the stored program. In this embodiment, the user is currently at exactly one hour into the 1½ hour program. In addition, the play status box may optionally indicate the current trick play status 735. In this embodiment, the user is fast forwarding through the program at 2 times the normal pace. Numerous other icons may be used to denote the following trick play conditions: Play, FF, REW, Slow, Slow Reverse, Stop, Pause, Advance, Previous and Next, Frame-by-Frame Forward and Reverse.

Status bar 710 is further depicted as including program title information 740 for the stored video content. While only a program title is depicted in FIG. 7, it should be appreciated that other programming information may similarly be incorporated into the status bar 710. Moreover, the status bar 710 of FIG. 7 may further include an optional storage status box 745 which indicates the remaining amount of video content storage.

FIG. 8 depicts another embodiment of the screen 705 of FIG. 7. However, in this embodiment a user has selected to view any available thumbnailed images which correspond to the chapter marks $725_a$-$725_d$. In one embodiment, thumbnail view 800 is displayed in response to a user request, as previously described with reference to FIG. 5.

As shown in FIG. 8, thumbnail view 800 is comprised of thumbnails $810_a$-$810_d$, which correspond to the chapter marks $725_a$-$725_d$. In this embodiment, focus has defaulted to thumbnail $810_c$, although it may similarly default to any other available thumbnail. In addition, a user may scroll through the available thumbnails $725_a$-$725_d$ using a left and right navigation. In addition, a chapter name may be included near the thumbnail currently in focus (e.g., "Mark 3"). Finally, users may request to exit the thumbnail view 800 (e.g., by pressing 'down' on a remote control device), or may simply wait for a predetermined delay period before the thumbnail view 800 is automatically exited.

It should be appreciated that, in the case of cached programming content, the beginning and ending thumbnails are always moving. As such, a predefined image instead may be displayed for the beginning and ending chapter marks for the cached content.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for navigating video content comprising:
   receiving a request to insert a digital bookmark at a desired viewing location of stored broadcast video content while the content is being stored, wherein the stored broadcast video content comprises cached broadcast video content stored in a volatile memory of a set-top box device coupled to a display device;
   inserting the digital bookmark at the desired viewing location by recording the desired viewing location into a metadata file stored separately from the stored broadcast video content;
   receiving a request to view the stored broadcast video content beginning from the desired viewing location; and
   displaying the digital bookmark and any other previously-defined bookmarks corresponding to the stored broadcast video content in a status bar simultaneously with the stored broadcast video content;
   displaying a plurality of thumbnail images simultaneously with the status bar, and as an overlay to the stored broadcast video content, wherein the plurality of thumbnail images comprises image data captured from the stored broadcast video content at a plurality of user-defined viewing locations of the stored broadcast video content and corresponds to the previously-defined bookmarks, including the digital bookmark; and
   generating a status box in the status bar to graphically indicate (a) a current amount of available non-cache storage time remaining, and (b) durations of a plurality of individual cached programs shown as segments of a progress bar.

2. The method of claim 1, wherein inserting the digital bookmark comprises recording a segment of identifiable program code onto a digital file containing the stored broadcast video content at a location corresponding to the desired viewing location.

3. The method of claim 2, wherein the stored broadcast video content includes a plurality of broadcast programs, and wherein the method further comprises automatically inserting a plurality of digital bookmarks into the stored video content indicating start and end points for the plurality of broadcasted programs.

4. The method of claim 1, further comprising:
   receiving a user selection of one of the plurality of thumbnail images; and
   accessing a corresponding location in the stored broadcast video content in response to the user selection of the one of the plurality of thumbnail images.

5. The method of claim 1, wherein displaying the plurality of thumbnail images comprises displaying the plurality of thumbnail images in response to a specific user request to display any available thumbnail images.

6. The method of claim 5, further comprising ceasing to display the plurality of thumbnail images upon the earlier of a specific user request to cease displaying the plurality of thumbnail images and a predetermined period of time.

7. The method of claim 1 wherein the plurality of thumbnail images further comprises image data corresponding to bookmarks automatically inserted at one or more of beginning of live cache, end of life cache, beginning of recorded program, and end of recorded program.

8. An apparatus coupled to a display device, the apparatus comprising:
   a memory containing one or more instruction sequences; and
   a volatile memory; and
   a processor coupled to said memory, said processor to execute the one or more instructions to,
      receive a request to insert a digital bookmark at a desired viewing location within stored broadcast video content while the content is being stored, wherein the stored broadcast video content comprises cached broadcast video content stored in the volatile memory,
      insert the digital bookmark at the desired viewing location by recording the desired viewing location into a metadata file stored separately from the stored broadcast video content,
      receive a request to view the stored broadcast video content beginning from the desired viewing location,
      display the stored broadcast video content beginning from the desired viewing location in response to the request to view,
   display the digital bookmark and any other previously-defined bookmarks corresponding to the stored broadcast video content in a status bar simultaneously with the stored broadcast video content,
   display a plurality of thumbnail images simultaneously with the status bar, and as an overlay to the stored broadcast video content, wherein the plurality of thumbnail images corresponds to image data captured from the stored broadcast video content at a plurality of user-defined viewing locations of the stored broadcast video content and corresponds to the previously-defined bookmarks, including the digital bookmark; and generate a status box in the status bar to graphically indicate (a) a current amount of available non-cache storage time remaining, and (b) durations of a plurality of individual cached programs shown as segments of a progress bar.

9. The apparatus of claim 8, wherein the digital mark is a segment of identifiable program code that is recorded onto a digital file containing the stored broadcast video content at a location corresponding to the desired viewing location.

10. The apparatus of claim 9, wherein the stored broadcast video content includes a plurality of broadcast programs, and wherein the processor is further to execute the one or more instructions to automatically insert a plurality of digital bookmarks the stored video content indicating start and end points for the plurality of broadcast programs.

11. The apparatus of claim 8, wherein the processor is further to execute the one or more instructions to:

receive a user selection of one of the plurality of thumbnail images, and access a corresponding location in the stored broadcast video content in response to the user selection of the one of the plurality of thumbnail images.

12. The apparatus of claim 8, wherein the processor is further to execute the one or more instructions to display the plurality of thumbnail images in response to a specific user request to display any available thumbnail images.

13. The apparatus of claim 12, wherein the processor is further to execute the one or more instructions to cease displaying the plurality of thumbnail images upon the earlier of a specific user request to cease displaying the plurality of thumbnail images and a predetermined period of time.

14. A computer program product comprising:

a non-transitory computer readable medium tangibly embodying computer executable program code thereon to navigate video content when executed by a computer, the computer executable program code including:

computer executable program code to receive a request to insert a digital bookmark at a desired viewing location of stored broadcast video content while the content is being stored, wherein the stored broadcast video content comprises cached broadcast video content stored in a volatile memory of a set-top box device coupled to a display device computer executable program code to insert the digital bookmark at the desired viewing location;

computer executable program code to receive a request to view the stored broadcast video content beginning from the desired viewing location;

computer executable program code to display the stored broadcast video content beginning from the desired viewing location in response to the request to view;

computer executable program code to display the digital bookmark and any other previously-defined bookmarks corresponding to the stored broadcast video content in the status bar simultaneously with the stored broadcast video content;

computer executable program code to display a plurality of thumbnail images simultaneously with the status bar, and as an overlay to, the stored broadcast video content, wherein the plurality of thumbnail images corresponds to image data captured from the stored broadcast video content at a plurality of user-defined viewing locations of the stored broadcast video content and corresponds to the previously-defined bookmarks, including the digital bookmark; and computer executable program code to generate a status box in the status bar to graphically indicate (a) a current amount of available non-cache storage time remaining, and (b) durations of a plurality of individual cached programs shown as segments of a progress bar.

15. The computer program product of claim 14, wherein said computer readable program code to insert said digital mark comprises computer readable program code to record a segment of identifiable program code onto a digital file containing said stored broadcast video content at a location corresponding to said desired viewing location.

16. The computer program product of claim 15, wherein said stored broadcast video content includes a plurality of broadcast programs, and wherein the computer program product further comprises computer readable program code to automatically insert a plurality of digital marks into said stored video content indicating start and end points for said plurality of broadcasted programs.

17. The computer program product of claim 14, further having:

computer executable program code to receive a user selection of one of the plurality of thumbnail images; and computer executable program code to access a corresponding location in the stored broadcast video content in response to the user selection of the one of the plurality of thumbnail images.

* * * * *

UNITED STATES PATENT AND TRADEMARK OFFICE
CERTIFICATE OF CORRECTION

PATENT NO.        : 8,566,879 B2                                              Page 1 of 1
APPLICATION NO.   : 11/081217
DATED             : October 22, 2013
INVENTOR(S)       : Nishikawa et al.

It is certified that error appears in the above-identified patent and that said Letters Patent is hereby corrected as shown below:

In the CLAIMS:
Claim 10, column 9, line 16-17, delete "bookmarks the" and insert --bookmarks into the--.
Claim 15, column 10, line 28, delete "said computer readable program code to insert said" and insert --the computer executable program code to insert the--.
Claim 15, column 10, line 29, delete "mark" and insert --bookmark--.
Claim 15, column 10, line 29, delete "readable" and insert --executable--.
Claim 15, column 10, line 31, delete "said" and insert --the--.
Claim 15, column 10, line 32, delete "said" and insert --the--.
Claim 16, column 10, line 34, delete "said" and insert --the--.
Claim 16, column 10, line 36, delete "readable" and insert --executable--.
Claim 16, column 10, line 38, delete "said" and insert --the--.
Claim 16, column 10, line 39, delete "broadcasted" and insert --broadcast--.

Signed and Sealed this
Seventeenth Day of February, 2015

Michelle K. Lee
*Deputy Director of the United States Patent and Trademark Office*